8153X
S. Merrick,
Wrench.
Patented Apr. 18, 1834.
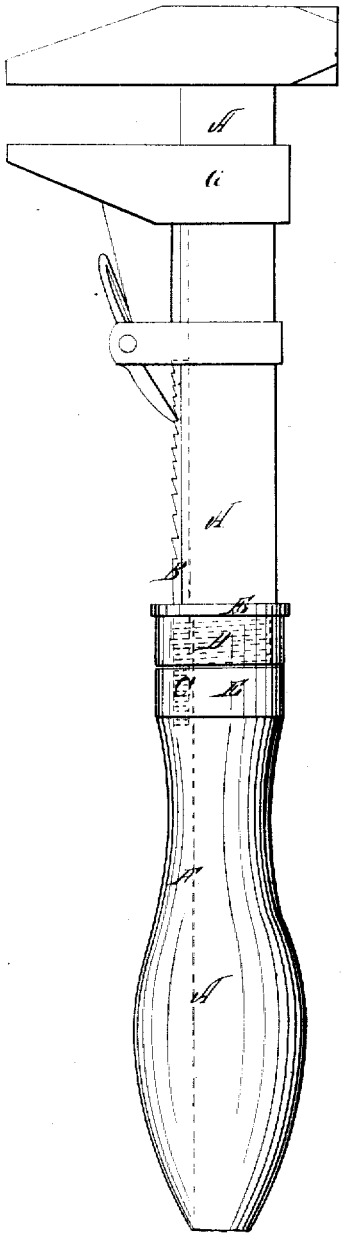
N. PETERS, PHOTO-LITHOGRAPHER, WASHINGTON, D. C.

Apl 18, 1834 8153X 115

Solyman Merrick Springfield Mass

Letters Patent.

The Schedule referred to in these Letters Patent and making part of the same containing a description in the words of the said Solyman Merrick himself of his improvement in the Rack Wrench.

To all to whom it may concern. Be it known that I Solyman Merrick of Springfield in the County of Hampden and State of Massachusetts have invented an improvement in the Rack Wrench invented by Henry King. and for which Letters Patent of the United States were granted to him on the 25th of October 1832. And I do hereby declare that the following is a full and exact description of my said improvement.

The main bar. the slide and the spring click may be made in the same form and manner of those in the original Rack wrench upon which this is an improvement. but instead of cutting the notches in which the spring click is to catch, directly upon the main bar. I make a sliding Rack of such length as may be necessary to regulate the distance of the jaws from each other which Rack I place in a groove in the upper side of the bar. Upon this sliding piece I cut teeth or notches to receive the spring click either at equal or at graduated distances from each other This sliding piece or moveable Rack is to be acted upon by a screw which must cause it to traverse backward & forward to a distance equal to that of the widest tooth in the Rack. What I deem one of the best m[illegible] of arranging the parts so as to accomplish this end is the following. I make the shank of the bar or that part of it which passes thro the handle round & form a square shoulder at the point where the square bar commences. on this round part I drive a turned collar which bears against the square part of the bar and there forms a flanch which keeps one end of a nut or ferule in its place which passes on to and revolves freely against it. A groove is made through this collar to correspond with that on the main bar that the rear end of

[illegible] of the sliding Rack before described may pass thro it. On this end of the Rack spiral grooves are cut which match into the thread of a female screw cut upon the inside of the revolving nut or ferule just alluded to.. this revolving ferule is then passed on to and against the aforenamed — collar. being screwed round so that the threads on its inner surface may take on the spiral grooves which form a segment of a male screw on the end of the rack. Another circular collar of the same diameter with the former which is equal or nearly equal to that of the revolving nut or ferule is then driven over the shank and against the nut but not so close-ly as to interfere with the revolving motion. the wooden handle may then be driven on the shank and riveted in its place. The outer surface of the nut should be milled that it may be the more readily turned round by the hand. It will be seen that by this arrangement whenever the slide is placed to the nearest desirable point on the rack, the jaws can be readily and precisely adjusted by turn-ing the nut - Although I have pointed out what I deem to be the best mode of arranging the parts so as to adjust the sliding Rack I do not intend therefore to confine myself to this particular arrange-ment but to vary the same in any way which is in accordance with the general principles or mode of action herein before set forth and by which a similar effect is produced limiting myself in my claim to improvement to the addition of the movable or sliding rack operated upon and adjusted by a screw.

Witnesses
William Bliss
Hiram Foot.

Solyman Merrick

Drawing (742 words)

~~Patented~~ April 18. 1844